United States Patent
Adenau

(10) Patent No.: US 9,402,291 B1
(45) Date of Patent: Jul. 26, 2016

(54) LIGHTING CONTROL CONSOLE HAVING A SLIDE CONTROL

(71) Applicant: MA LIGHTING TECHNOLOGY GmbH, Waldbuttelbrunn (DE)

(72) Inventor: Michael Adenau, Wurzburg (DE)

(73) Assignee: MA LIGHTING TECHNOLOGY GMBH, Waldbuttelbrunn (DE)

( * ) Notice: Subject to any disclaimer, the term of this patent is extended or adjusted under 35 U.S.C. 154(b) by 33 days.

(21) Appl. No.: 14/615,832

(22) Filed: Feb. 6, 2015

(51) Int. Cl.
*H05B 33/08* (2006.01)
*H05B 37/02* (2006.01)

(52) U.S. Cl.
CPC .......... *H05B 33/0863* (2013.01); *H05B 37/029* (2013.01); *H05B 37/0254* (2013.01)

(58) Field of Classification Search
CPC ........... H05B 33/0815; H05B 33/0818; H05B 33/0884; H05B 33/0809; H05B 33/0848; H05B 33/0896; F21V 33/0052; F21V 33/0056; F21Y 2101/02
USPC ............. 315/297, 153, 316, 312; 362/85, 233
See application file for complete search history.

(56) References Cited

U.S. PATENT DOCUMENTS

| | | | | | |
|---|---|---|---|---|---|
| 4,173,941 | A | * | 11/1979 | Castagna | H05K 5/0017 116/278 |
| 5,329,431 | A | * | 7/1994 | Taylor | G05B 19/0421 315/316 |
| 5,769,527 | A | * | 6/1998 | Taylor | G05B 19/0421 315/316 |
| 5,982,355 | A | * | 11/1999 | Jaeger | G02F 1/13306 345/161 |
| 2002/0069747 | A1 | * | 6/2002 | Bartz | G10H 3/18 84/645 |
| 2005/0231948 | A1 | * | 10/2005 | Pohlert | F21V 14/06 362/237 |
| 2007/0103447 | A1 | * | 5/2007 | Varian | G06F 3/0219 345/173 |
| 2008/0259600 | A1 | * | 10/2008 | Pohlert | F21K 9/58 362/235 |
| 2009/0190327 | A1 | * | 7/2009 | Adenau | G06F 3/04886 362/85 |
| 2010/0238127 | A1 | * | 9/2010 | Adenau | G06F 17/5004 345/173 |
| 2012/0004745 | A1 | * | 1/2012 | Adenau | G06F 1/1616 700/90 |
| 2012/0153870 | A1 | * | 6/2012 | Kirkup | H05B 33/0863 315/312 |
| 2014/0265924 | A1 | * | 9/2014 | Adenau | H05B 37/0245 315/297 |
| 2015/0091446 | A1 | * | 4/2015 | Ohta | H05B 37/0227 315/153 |
| 2016/0003428 | A1 | * | 1/2016 | Anderson | F21S 8/033 362/147 |

* cited by examiner

*Primary Examiner* — Douglas W Owens
*Assistant Examiner* — Syed M Kaiser
(74) *Attorney, Agent, or Firm* — Benjamin C. Armitage; Billion & Armitage

(57) ABSTRACT

The invention relates to a lighting control console for controlling a lighting system. At least one slide control is provided in the control panel of the lighting control console, which slide control allows users to enter input values by linearly adjusting a control knob, wherein a contact holder is provided at the slide control. A linkage lever links the control knob and the contact holder. In the housing of the lighting control console, at least one light source is provided, wherein at least one light exit is provided at the control knob, and wherein a light conducting element is provided between the light source and the light exit, in which element the light of the light source can be transmitted to the light exit at the control knob.

16 Claims, 6 Drawing Sheets

__US 9,402,291 B1__

LIGHTING CONTROL CONSOLE HAVING A SLIDE CONTROL

BACKGROUND

Generic lighting control consoles serve for controlling lighting systems such as those employed in theaters or on concert stages, for instance. Routinely, said lighting systems comprise a plurality of lighting devices, such as stage spotlights, wherein, in the lighting devices on their own, it is also possible to switch between a plurality of lighting states, for instance between different colors. These different lighting states are controlled in the lighting program of the lighting control console by way of programmed parameters. Here, standard lighting systems may comprise up to several thousand lighting devices. In order to be able to control such complex lighting systems, the generic lighting control consoles are equipped with a digital processor, which permits digital data and signal processing. For storing the data, a digital memory is further provided, which in particular allows for archiving of lighting programs.

For programming the lighting program or for controlling the lighting program while it is running, operators have to enter control commands as input values. Said control commands can, for instance, be the selection of a specific lighting device or the setting of a specific parameter, for instance of luminosity. For entering these control commands, mechanical control elements, for instance key buttons, rotary controls or slide controls, are available at known lighting control consoles. Here, the control commands being assigned to the individual control elements may be altered by way of suitable menu changeovers in order to be able to program and control correspondingly complex lighting programs.

The slide controls being installed at the known lighting control consoles are characterized in that entries are made by linearly adjusting a control knob. Here, the control knob is mechanically linked to a contact holder through a slit in the housing of the lighting control console, such that the linear adjustment of the control knob can directly be transmitted onto the contact holder, which is located inside of the housing. At least one sliding contact is in turn provided at the contact holder, which contact abuts upon a linear contact track. Depending on the relative position of the sliding contact on the linear contact track, different input values are the result.

Lighting control consoles are frequently employed in an environment that has to be kept dark, for instance in the auditorium of a theater or in a concert hall, where extraneous light for lighting the control panel at the lighting control console is undesired. In order to still allow users to safely access different control elements, control elements are known which, at the control knob, exhibit an illuminant that is electrically controlled, for instance a light bulb. This has the disadvantage that, for supplying the illuminant in the control knob with electricity, corresponding cabling from the interior of the housing of the lighting control console has to be laid to the control knob that is arranged outside of the housing. Considerable safety problems result therefrom since components outside of the housing are within the reaching area of the hands of the users and therefore have to be reliably protected against electric shocks. Besides, due to the illuminant in the control knob, the control knob may heat up, which is undesired.

SUMMARY

Embodiments of the present invention relate to a novel lighting control console having a slide control that is lit, which can be produced in a cost-effective fashion and which at the same time solves the problems with regard to electrical safety and the undesired heating-up.

DESCRIPTION OF THE DRAWINGS

In the drawings, one embodiment of the invention is schematically illustrated and will be explained by way of example in the following.

In the figures.

DETAILED DESCRIPTION

Figure 1:
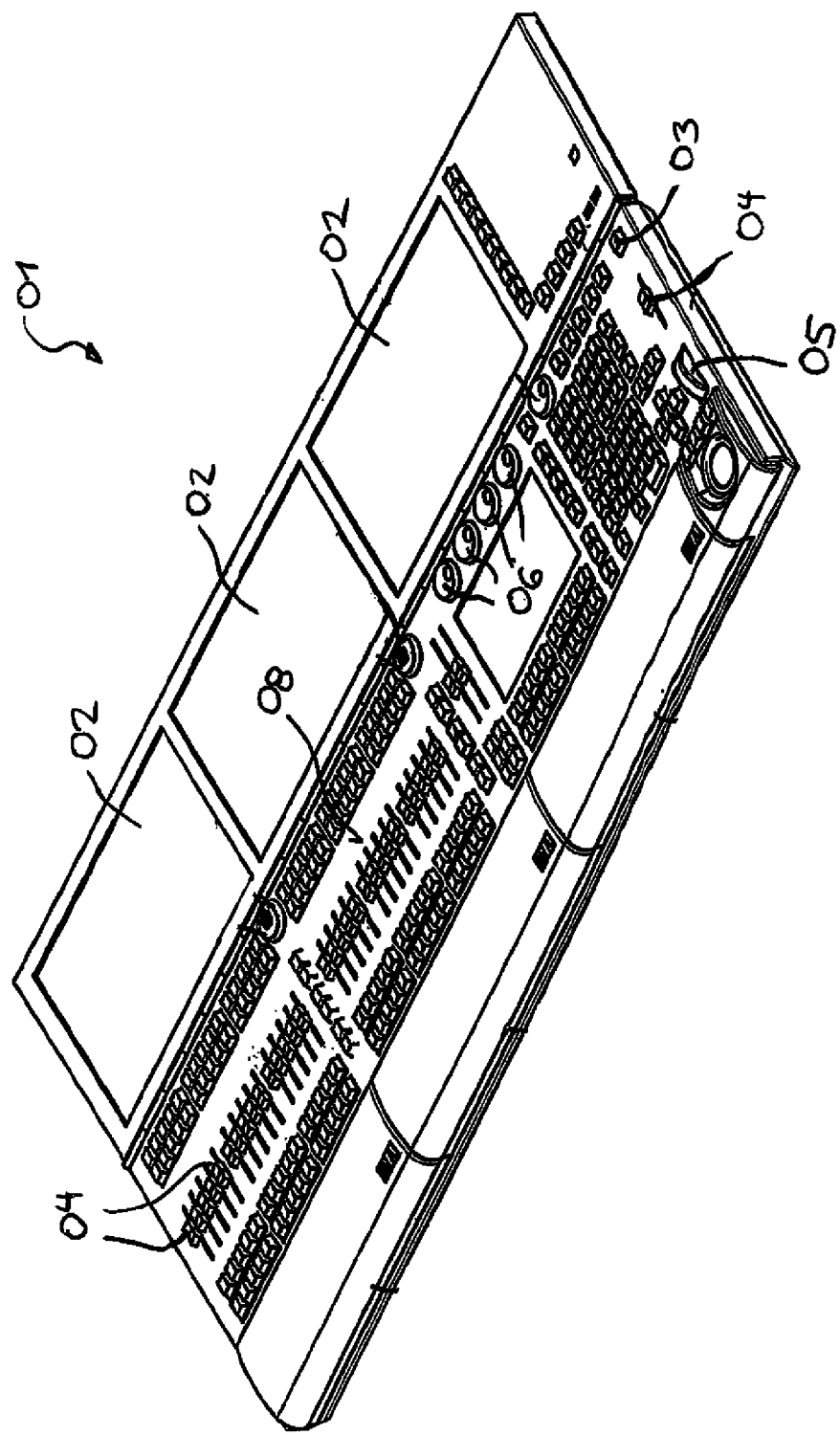
FIG. 1 shows a lighting control console having several slide controls in a perspective view from the front.

The slide control at the lighting control console in accordance with embodiments of the invention is characterized in that the light source for lighting the control knob is not installed outside of the housing, in the control knob. Instead, the light source is located inside of the housing and is transmitted to a light exit at the control knob by means of a light conducting element. By arranging the light source inside of the housing, the safety requirements with respect to electrical safety of the lighting control console are solved without any problem since the interior of the housing is out of reach of the users. It is also precluded that the control knob itself heats up, which would be undesired. Solely the light that is required for lighting the control knob is transmitted from the light source being arranged in the housing to the control knob by means of the light conducting element.

It is in principle arbitrary at which point inside of the housing the light source is arranged in the lighting control console. For instance, it is conceivable that the light source is arranged on the main circuit board of the lighting control console and is for instance transmitted from this point to the control knobs of the slide controls to be lit by means of long optical fibers. This type of light transmission by means of long optical fibers, however, makes it necessary to carefully lay the optical fibers so that they function reliably and no damage occurs even in case of a long running time. A particularly simple and reliable design results if the light source for lighting a slide control is arranged at the contact holder of said slide control and, via a sliding contact at the contact holder itself, is supplied with electrical power. In this manner, the light source moves along with the contact holder of the slide control and the transmission of the light that is required for lighting is only required in the space between the contact holder and the control knob. Relatively short light conducting elements result therefrom, having correspondingly few light losses. Electrical safety moreover continues to be given since the contact holder of the slide control always has to be installed in the housing of the lighting control console.

In order for the slide control to run for longer times, it may be preferable that the contact zone of the sliding contacts with the linear contact tracks, and is protected against dust penetrating into the same and being deposited on the contact tracks, which could deteriorate the electrical contact between the contact tracks and the sliding contacts. In an example of the lighting control console in accordance with the invention, a dust cover is provided at the slide control, said dust cover being arranged between the contact track on the one hand and the slit in the housing of the lighting control console for passing the linkage lever through on the other hand. The contact track, by way of the dust cover, is protected from the top against dust penetrating into the interior of the housing through the slit in the housing. Here, the linkage lever, which links the control knob outside of the housing and the contact holder inside of the housing, includes an arc-shaped portion for laterally reaching around the dust cover. In this manner, despite the contact track being covered by the dust cover that is arranged above the same, a direct transmission of the adjusting movements from the control knob onto the assigned contact holder can be provided.

If, for protecting the contact tracks from dust, a dust cover is provided, the light conducting element could also include an arc-shaped portion, which can laterally reach around the dust cover. In this manner, it is again provided that the light can pass around the dust cover in the shortest possible way, in order to prevent unnecessary light losses inside of the light conducting element.

It is in principle arbitrary in which manner the light conducting element is fastened to the slide control. Here, a particularly simple and cost-effective possibility results if the light conducting element is directly fastened to the linkage lever since the linkage lever also extends between the control knob on the one hand and the contact holder on the other hand and moreover presents the required mechanical stiffness. A particularly simple possibility of fastening the light conducting element to the linkage lever results if the linkage lever includes a slit-shaped recess, in which the light conducting element is accommodated so as to fix it.

From a physical point of view, various principles for realizing a light conducting element are conceivable. In particular, optical fibers being made of plastic or glass can be utilized as light conducting elements. Since the light conducting element, in the area of application in accordance with the invention, only has to cover a relative short distance, utilizing a light conducting element whose outer surface is formed by several planar body surfaces is particularly cost-effective. At the inner side of said planar body surfaces, the light can then be reflected and passed on in the interior of the light conducting element.

In order to prevent stray light of other light sources inside of the housing of the lighting control console from being injected into the light conducting element and to moreover limit the extent to which light is emitted from the interior of the light conducting element, which is undesired, it is particularly advantageous if a cover is attached above the light conducting element.

It is again in principle arbitrary in which manner the light exit at the control knob is designed. In order to avoid that undesired diffused light is emitted and at the same time to make it possible to clearly identify the control knob by way of the light from the light source, it is particularly advantageous if a groove-shaped depression is provided at the upper side of the control knob, the light exit joining said depression. Due to the flanks of the groove-shaped depression, diffused light effects are reduced and the light from the light conducting element is only emitted to the top from the groove-shaped depression in a targeted fashion.

In order to allow for electromechanical adjustment of the slide control while a lighting program is running, it is particularly advantageous if the slide control can be driven by remote control with the help of a drive motor. Here, a driving belt can transmit the force from the drive shaft of the drive motor onto the contact holder of the slide control.

The lighting control console having the slide control that is lit can be produced in a particularly cost-effective fashion if the light conducting element is produced from a plastic material that conducts light.

In particular LED illuminants are suitable as light sources for lighting the control knob. Besides, such LED components can be arranged on the circuit board of the contact holder and can be electrically connected in a very simple and cost-effective fashion.

In order to be able to light the slide controls, for instance, with different colors depending on their function that is menu-controlled in each instance, for example, it is particularly advantageous if the luminous color of the light source can be changed or if several LED illuminants having different colors are available.

In order to ensure the most uniform light distribution possible at the light exit of the control knob, a diffusing element can be arranged at the light exit.

It is additionally conceivable that the control knob itself is produced from a transparent material, which then serves as a light exit on its own.

If it is not desired to light the entire control knob that is produced from a transparent material, the control knob can be coated with a coating that is impervious to light, wherein the coating includes at least one clearance at which the light can be emitted from the transparent material of the control knob to the outside.

FIG. 1, in a perspective view, shows a lighting control console 01 in accordance with the invention for programming and controlling a stage lighting system. The lighting control console 01 is equipped with three monitors 02 for displaying various menus for users. For entering adjusting commands, a plurality of push buttons 03, slide controls 04, adjusting wheels 05 and rotary controls 06 is provided at the lighting control console 01.

Figure 2:
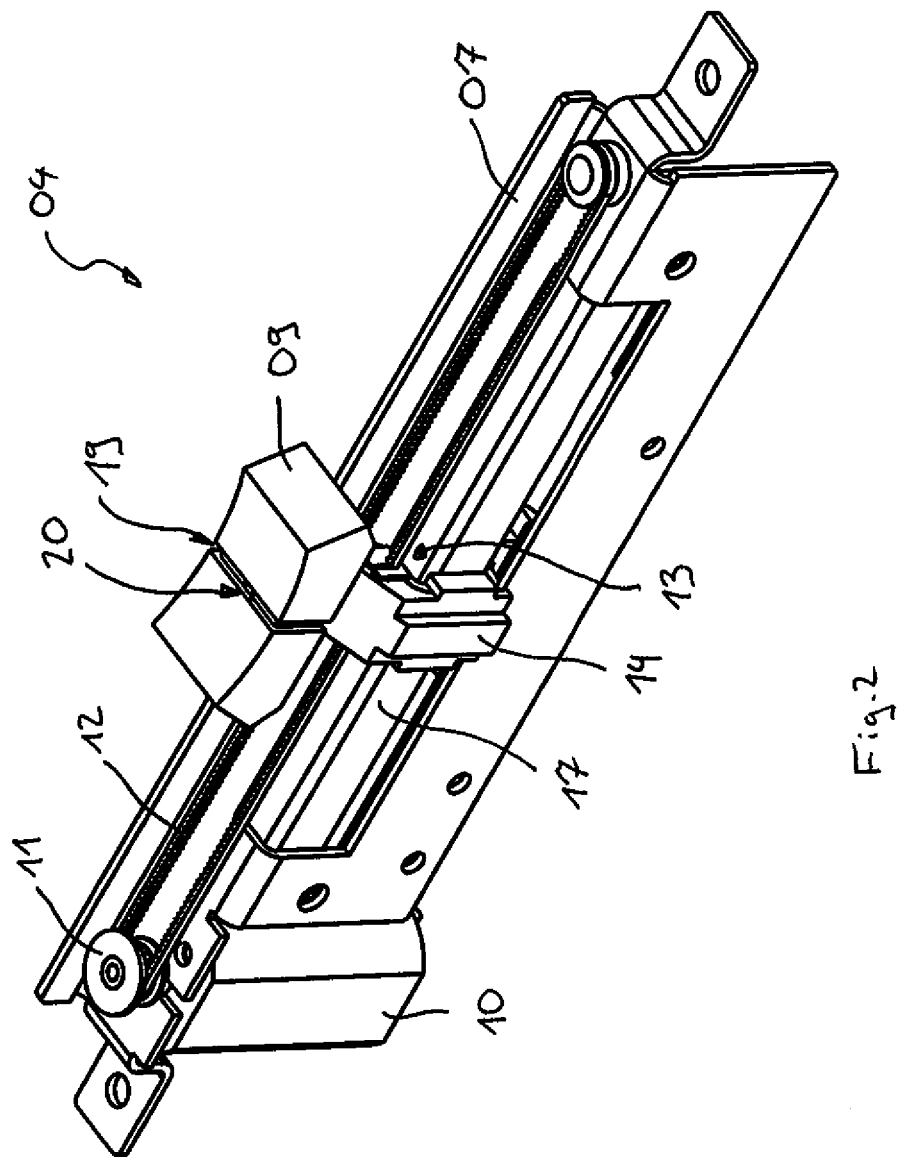
FIG. 2 shows a slide control of the lighting control console in accordance with FIG. 1 in a perspective view from the front.

FIG. 2 shows a slide control 04 of the lighting control console 01 in an enlarged perspective view from the front. The slide control 04 is installed in the interior of the housing 08 of the lighting control console 01 by means of a bracket 07. Here, the control knob 09 is located outside of the housing and can manually be adjusted along the longitudinal axis of the slide control 04 by the users of the lighting control console 01 in order to enter control commands. Besides, the slide control 04 can be driven by electromotive forces by means of an electric motor 10. Here, the forces are transmitted by means of a drive pinion 11 and of a driving belt 12. Forces from the control knob 09 or from the driving belt 12 are transmitted onto the electrical components of the slide control 04 by means of a linkage lever 13, which, in FIG. 2, is illustrated being concealed under a cover 14. For protecting the electrical contact tracks 15 (see FIG. 4), at which the sliding contacts 16 (see FIG. 5) of the slide control 04 are electrically contacted, from dust, a dust cover 17 is attached above the contact tracks 15. Due to the dust cover 17, dust, which penetrates into the interior of the housing from the region outside of the housing 08 through the slits 18 (see FIG.

7) provided for the linkage levers 13, is prevented from reaching the contact zone between the contact tracks 15 and the sliding contacts 16.

At the control knob 09, a groove-shaped depression 19 is provided, at the base of which a light exit 20 is provided. During operation of the lighting control console 01, light can be emitted at the light exit 20 for marking the control knob 09 even in dark environments.

Figure 3:
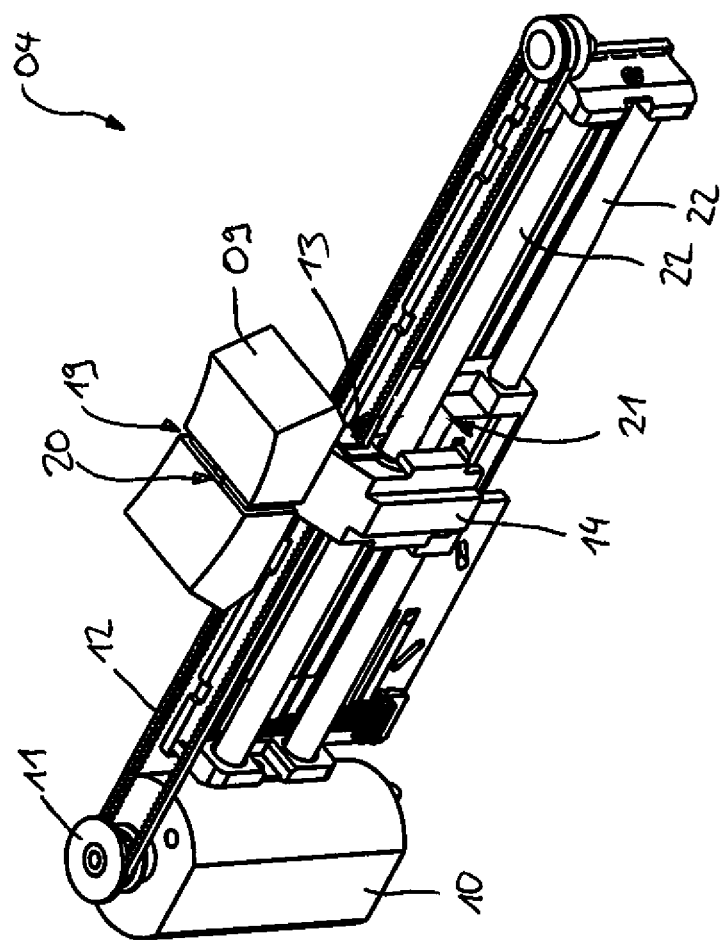
FIG. 3 shows the slide control in accordance with FIG. 2 after the dust cover has been mounted, in a perspective view from the front.

FIG. 3 shows the slide control 04 after the bracket 07 and the dust cover 17 have been demounted. The contact holder 21 of the slide control 04 can be seen, which holder, by means of the linkage lever 13 being covered by the cover 14, can manually be shifted in relation to the contact tracks 15 from the control knob 09 or electromechanically by way of the electric motor 10. Here, the contact holder 21 is borne on two bearing axes 22 so as to be linearly shiftable.

Figure 4:
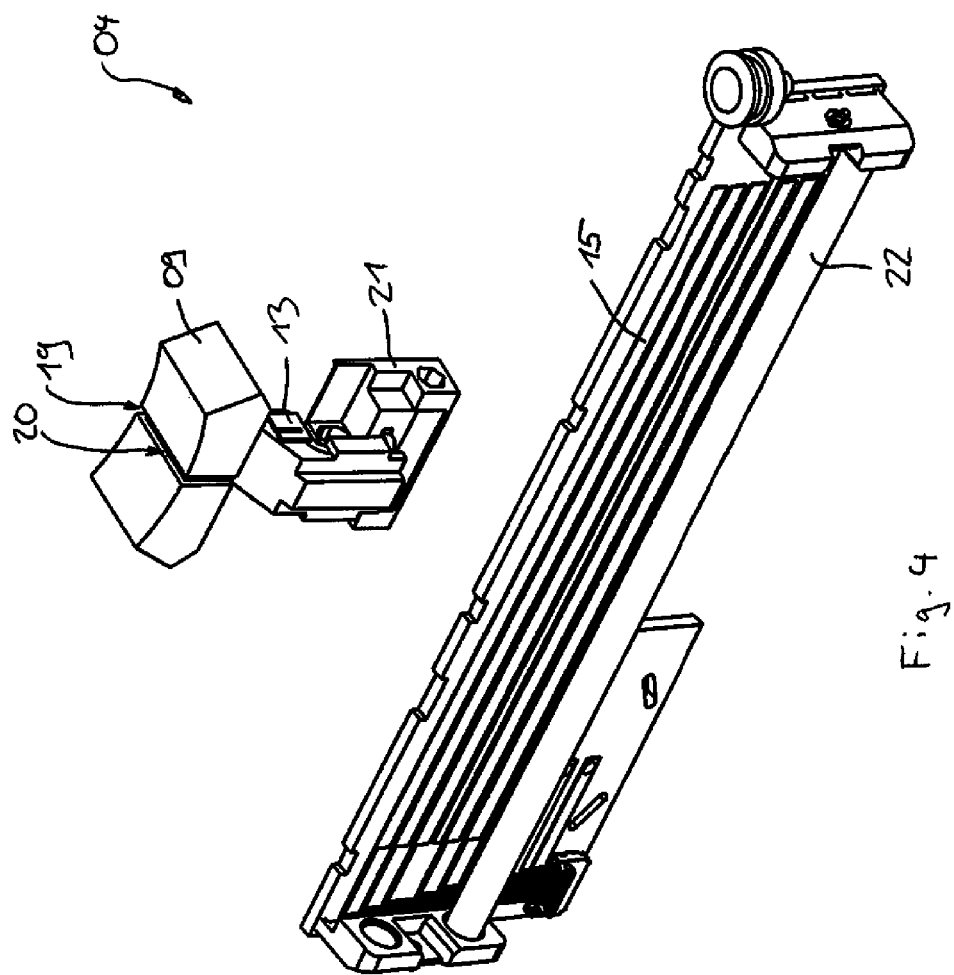
FIG. 4 shows the slide control in accordance with FIG. 3 after the contact holder having the linkage lever being fastened thereto and having the control knob being fastened thereto has been mounted.

FIG. 4 shows the slide control 04 after the contact holder 21, which has the linkage lever 13 being fastened thereto, the control knob 09 and the cover 14, has been demounted as well. Two of the contact tracks 15 are provided on the contact holder 21 for energy supply of a light source 23, namely of an LED illuminant.

Figure 5:
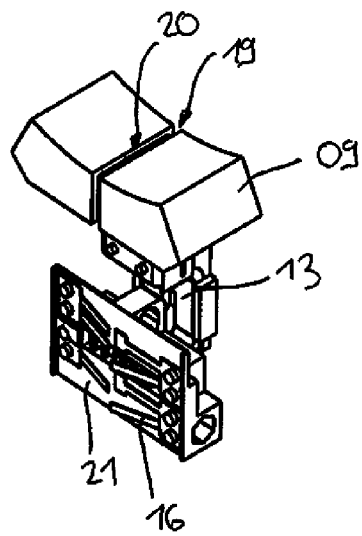
FIG. 5 shows the contact holder having the linkage lever and the control knob in accordance with FIG. 4 in a perspective view from behind.

FIG. 5 shows the back of the contact holder 21 having the sliding contacts 16 being fastened thereto. One contact track 15 is assigned to each sliding contact 16. If the contact holder 21 is shifted by manual drive at the control knob 09 or by electromotive drive by means of the electric motor 10, the sliding contacts 16 are axially shifted across the contact tracks 15, whereby an electric output signal, which serves as an input value, is correspondingly changed.

Figure 6:
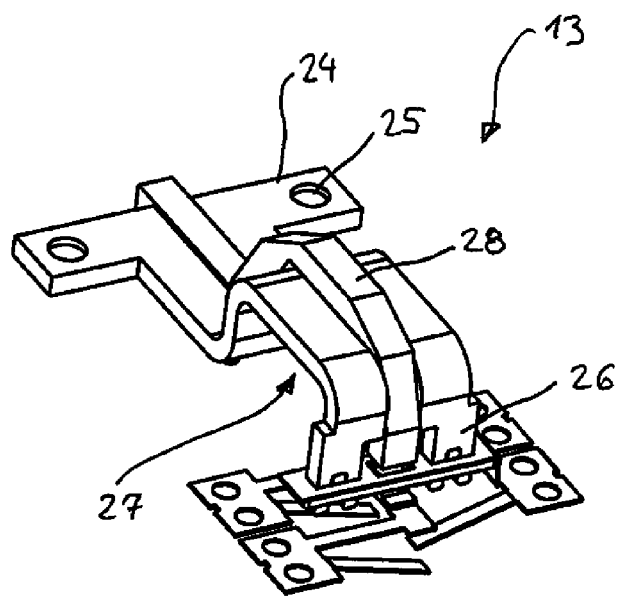
FIG. 6 shows the linkage lever having the light conducting element being fastened thereto in a perspective view from the front.

FIG. 6 shows the linkage lever 13 in an enlarged perspective view. The linkage lever 13 is embodied as a bent sheet metal part. The control knob 09 can be plugged on the upper end 24 of the linkage lever 13 in a form-fitting manner and can be locked by means of fastening holes 25. The lower end 26 of the linkage lever 13 is mechanically linked to the contact holder 21. An arc-shaped portion 27 extends between the upper end 24 and the lower end 26 of the linkage lever 13, with which portion the linkage lever 13 laterally reaches around the dust cover 17. In the middle of the linkage lever 13, the bent sheet metal part includes two slit portions, into which a light conducting element 28 is plugged in a form-fitting and force-fitting manner. The light conducting element 28 also includes an arc-shaped portion 33, which laterally reaches around the dust cover 17. In the following, the function of the light conducting element 28 is explained in more detail on the basis of the cross-section in FIG. 7.

Figure 7:
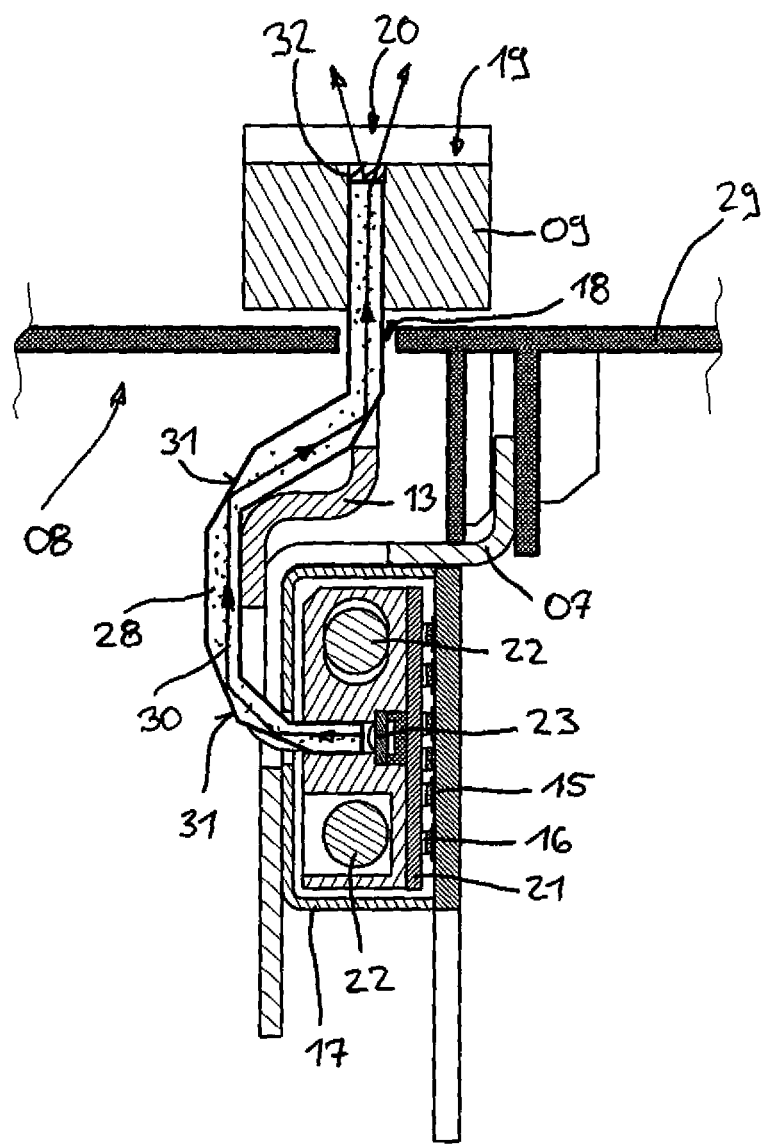
FIG. 7 shows the slide control in accordance with FIG. 1 in a cross-section.

FIG. 7 shows the slide control 04 of the lighting control console 01 in a schematized cross-section. Here, the cover 14 is not illustrated in FIG. 7. It can be seen that the housing wall 29, in the control panel of the lighting control console 01, includes several slits 18, through which the linkage levers 13 are in each instance guided out of the interior of the housing 08 to the control panel on the outside. One control knob 09 in each instance is plugged on the upper ends of the linkage levers 13.

At the contact holder 21, which holds the sliding contacts 16 on the outside, a light source 23, namely an LED illuminant, is attached on the inner side, which LED illuminant is supplied with electrical energy via two of the sliding contacts 16 from two contact tracks 15. In the light conducting element 28, the light 30 being emitted by the light source 23 is transmitted to the light exit 20 at the control knob 09, starting from the light source 23. In order to provide this light transmission, the light conducting element 28 being manufactured from plastic includes several planar body surfaces 31, at which the light 30 in the interior of the light conducting element 28 is reflected. Besides, a diffusing element 32 is fastened to the light exit 20, which element serves for uniformly distributing the light 30 at the light exit 20.

The invention claimed is:

1. A lighting control console for controlling a lighting system, comprising:
    a lighting control console, capable of generating digital adjusting commands;
    data links, capable of transmitting commands to lighting devices of the lighting system; and wherein the lighting control console includes
        at least one digital processor and at least one digital memory for generating, managing and storing the adjusting commands;
        at least one display device, in which graphic elements can graphically be depicted for users at the display device;
        at least one slide control positioned in a control panel of the lighting control console, capable of allowing users to enter input values by linearly adjusting a control knob;
        a contact holder positioned at the slide control;
        at least one sliding contact positioned at the contact holder, the contact abuts on a linear contact track,
        a linkage lever, linking the control knob and the contact holder; and
        a slit positioned in a housing of the lighting control console, through which slit the linkage lever reaches starting from an interior of the housing, thereby mechanically linking the control knob and the contact holder,
    wherein the housing of the lighting control console includes,
        at least one light source;
        at least one light exit at the control knob; and
        a light conducting element positioned between the light source and the light exit, in which by the element, light of the light source can be transmitted to the light exit at the control knob.

2. The lighting control console according to claim 1, wherein
    the light source is arranged at the contact holder and, via a sliding contact, is supplied with electrical power from a contact track, wherein the light conducting element extends between the light exit at the control knob and the light source at the contact holder.

3. The lighting control console according to claim 1, further comprising
    a dust cover positioned at the slide control, said dust cover being arranged between the contact track and the slit in the housing, wherein the linkage lever includes an arc-shaped portion for laterally reaching around the dust cover.

4. The lighting control console according to claim 3, wherein
    the light conducting element includes an arc-shaped portion for laterally reaching around the dust cover.

5. The lighting control console according to claim 1, wherein
    the light conducting element is fastened to the linkage lever.

6. The lighting control console according to claim 5, wherein
    the linkage lever includes a slit-shaped recess, in which the light conducting element is accommodated so as to fix it.

7. The lighting control console according to claim 1, wherein at least several outer surfaces of the light conducting element are formed by planar body surfaces, at which the light of the light source can be reflected in the interior of the light conducting element in the direction of the light exit.

8. The lighting control console according to claim 1, wherein
a cover that is impervious to light is attached above the light conducting element.

9. The lighting control console according to claim 1, wherein the light exit is arranged at the upper side of the control knob in a groove-shaped depression.

10. The lighting control console according to claim 1, wherein
the slide control can be driven by remote control, at least partially powered by a drive motor.

11. The lighting control console according to claim 1, wherein
the light conducting element is produced from a plastic material that conducts light.

12. The lighting control console according to claim 1, wherein
the light source is an LED illuminant.

13. The lighting control console according to claim 1, wherein
the luminous color of the light source can be changed.

14. The lighting control console according to claim 1, wherein
a diffusing element is arranged at the light exit.

15. The lighting control console according to claim 1, wherein
the control knob is produced from a transparent material.

16. The lighting control console according to claim 15, wherein
the transparent control knob includes a coating that is impervious to light, and wherein the coating includes at least one opening through which light can be emitted.

\* \* \* \* \*